United States Patent [19]

Ja

[11] Patent Number: 5,742,581
[45] Date of Patent: Apr. 21, 1998

[54] TRANSMISSIVE OPTICAL AND MAGNETO-OPTICAL DATA STORAGE MEDIA

[75] Inventor: Yu Hong Ja, San Jose, Calif.

[73] Assignee: Read-Rite Corporation, Milpitas, Calif.

[21] Appl. No.: 779,394

[22] Filed: Jan. 7, 1997

[51] Int. Cl.$^6$ .................................................. G11B 7/00
[52] U.S. Cl. ................... 369/275.1; 369/13; 369/275.4; 369/283
[58] Field of Search ........................ 369/275.1, 121, 369/13, 275.4, 283

[56] References Cited

U.S. PATENT DOCUMENTS 5,255,262 10/1993 Best et al. .
5,625,617 4/1997 Hopkins et al. .................. 369/121

OTHER PUBLICATIONS

"Optical Beam Deflection Using Dynamic Volume Reflection Gratings" in Optical and Quantum Electronics 21 (1989), pp. 151–154.

"Scanning Beam Collimation Method for Measuring Dynamic Angle Variations Using an Acousto–Optic Deflector", Lijiang Zeng, et al., 1662 Opt. Eng. 35(2) 1662–1663 (Jun. 1996).

"Volume Holographic Memory Systems: Techniques and Architectures", Optical Engineering, Aug. 1995, vol. 34, No. 8, pp. 2193–2203.

Primary Examiner—Tod R. Swann
Assistant Examiner—Kim-Kwok Chu
Attorney, Agent, or Firm—Robert King; Samuel Kassatly

[57] ABSTRACT

An optical data storage medium transmissive to a laser beam and formed of a light transmissive substrate that provides mechanical support, and a light transmissive data substrate formed on the substrate. The data substrate is patterned to form block regions that block the laser beam from passing through, and pass regions that allow the laser beam to pass through, such that the blockage or passage of light through the optical storage medium reflects the type of data bits to be stored on the optical medium. In another embodiment a magneto-optical data storage medium which is also transmissive (or partly transmissive) to a laser beam includes a data magneto-optical data substrate formed on a substrate. The data substrate is recordable by patterning a magnetic domain with magnetic fields of opposite directions, such that each magnetic direction reflects the type of data bits to be stored on the optical medium. In yet another embodiment the data substrate includes a combination of block and pass regions as well as one or more writeable and/or recordable films.

21 Claims, 14 Drawing Sheets

TRANSMISSIVE OPTICAL AND MAGNETO-OPTICAL DATA STORAGE MEDIA

CROSS REFERENCE TO RELATED APPLICATIONS

The present patent application relates to the following patent applications by the same applicant herein, assigned to the same assignee, and incorporated herein by reference:

Ser. No. 08/779,461, filed on Jan. 7, 1997, titled "Optical and Magneto-Optical Data Storage Systems Using Transmissive Media";

Ser. No. 08/779,462, filed on Jan. 7, 1997, titled "Stationary Optical Head Using Holographic or Acousto-Optical Deflection"; and Ser. No. 08/779,463, filed on Jan. 7, 1997, titled "Stationary Optical Data Storage System Using Holographic or Acousto-Optical Deflection".

BACKGROUND OF THE INVENTION

1. Field of the Invention

This invention relates generally to optical and magneto-optical data storage systems, and in particular to transmissive optical and magneto-optical data storage media.

2. Description of Related Art

Optical and magneto-optic data storage systems store great quantities of data on a disk. The data is accessed by focusing a laser beam onto the disk and detecting the reflected light beam. Three kinds of systems are well known. The first kind is a ROM (Read Only Memory) system in which data is permanently embedded as marks in the disk. The data is detected as a change in reflectivity as the laser beam impinges on the data marks.

The second kind is a WORM (Write-Once-Read-Many) system that allows the user to write data by making marks, such as pits, on a blank optical disk surface. Once the data is recorded onto the disk it cannot be erased. The data in a WORM system is also detected as a change in reflectivity.

The third kind is a WREM (Write-Read-Erase-Many) system in which a laser beam is used to heat a magneto-optic data layer to a critical temperature, generally just below the Curie temperature, in order to write and erase the data. As the critical temperature is reached, the magnetic domain field strength is reduced to close to zero. An external magnetic field, using an electromagnet or a permanent magnet, is then used to reverse the domain to record a one or a zero. In general data is recorded by orienting the magnetic domain of a spot in either an up or a down position. The WREM system reads the recorded data by directing a low power (reading) laser beam to the data layer. The difference in magnetic domain directions causes the plane of polarization of the light beam to be rotated one way or the other, clockwise or counterclockwise. This change in orientation of polarization is then detected and recognized as either a digit "1" or "0".

U.S. Pat. No. 5,255,262 to Best et al., titled "Multiple Data Surface Optical Data Storage System With Transmissive Data Surfaces", issued on Oct. 19, 1993, which is incorporated herein by reference, describes an optical data storage system that includes a multiple data surface medium and an optical head. The medium includes several substrates that are separated by a light transmissive medium. With the exception of the last data layer, data surfaces are substantially light transmissive and are located on the substrate surfaces which lie adjacent to a light transmissive medium. The optical head includes an aberration compensator to allow the head to focus onto the different data surfaces, and a filter to screen out unwanted reflected light.

This patented system is relatively complicated and its manufacture is labor intensive. Also, the system uses a focusing mechanism, which adds complexity and cost, and reduces the system signal to noise ratio.

Therefore, there is still a greatly unsatisfied need for an optical and a magneto-optical data storage systems that reduce the number of components, thus simplifying the overall structure, reducing its cost, and improving its performance.

SUMMARY OF THE INVENTION

In a preferred embodiment of the present invention, an optical data storage medium transmissive to a laser beam is formed of a light transmissive substrate that provides mechanical support, and a light transmissive data substrate formed on the substrate. The data substrate is patterned to form block regions that block the laser beam from passing through, and pass regions that allow the laser beam to pass through, such that the blockage or passage of light through the optical storage medium reflects the type of data bits to be stored on the optical medium.

In another embodiment a magneto-optical data storage medium which is also transmissive to a laser beam includes a data magneto-optical data substrate formed on a substrate. The data substrate is recordable by patterning a magnetic domain with magnetic fields of different (i.e., opposite) directions, such that each magnetic direction reflects the type of data bits to be stored on the optical medium. In yet another embodiment the data substrate includes a combination of block and pass regions as well as one or more writeable and/or recordable films.

BRIEF DESCRIPTION OF THE DRAWINGS

The features of the present invention and the manner of attaining them, will become apparent, and the invention itself will be understood by reference to the following description and the accompanying drawings, wherein.

Similar numerals refer to similar elements in the drawings. It should be understood that the sizes of the different components in the figures may not be in exact proportion, and are shown for visual clarity and for the purpose of explanation.

DETAILED DESCRIPTION OF THE INVENTION

Figure 1:
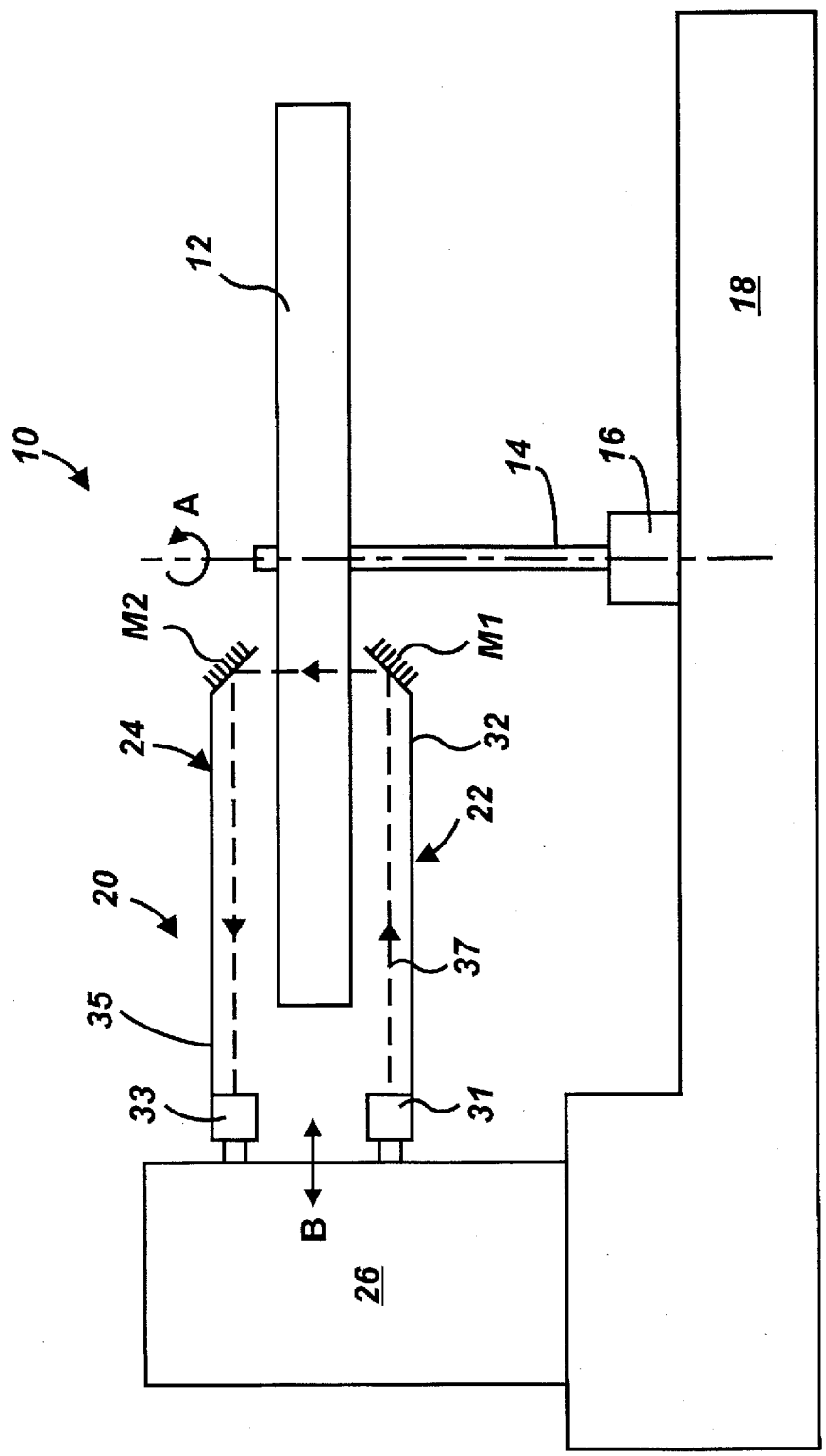
FIG. 1 is a schematic diagram of an optical system according to the present invention.

FIG. 1 is a schematic view of an optical data storage system 10 according to the present invention. The system 10 includes an optical data storage medium such as a CD ROM, a WORM, or a WREM disk 12. An important characteristic of the disk 12 is that it is partly or completely optically transmissive for allowing a laser or light beam to pass through. The disk 12 is removably mounted on a spindle 14. The spindle 14 is rotatably secured to a motor 16 which, in turn, is secured to a chassis 18. The motor 16 rotates the spindle 14 as well as the disk 12 around an axis in the direction of the arrow A.

The system 10 further includes an optical head 20 composed of two optical arms 22, 24 secured to a platform 26 which is movably mounted on the chassis 18. The first optical arm 22 is positioned below the disk 12, and the second optical arm 24 is positioned above the disk 12, in registration with the first optical arm 22. It should be understood that in another embodiment the positions of the optical arms 22, 24 relative to the disk 12 may be reversed.

The first optical arm 22 is formed of a light source 31 such as a laser source, which is distally connected to a first reflective mirror M1 via a link 32. The second optical arm 24 is formed of a second reflective mirror M2 which is distally connected to a photo-detector 33 via a link 35. The mirrors M1 and M2 are capable of traveling between an innermost track referred to as the inner diameter (ID) track, and an outermost track referred to as the outer diameter (OD) track.

In operation, the optical head 20 moves radially, i.e., linear actuation, relative to the disk 12, in the direction of the arrow B. It should be clear to a person skilled in the art that the optical head 20 may alternatively be moved pivotally, i.e., rotary actuation. The laser source 31 generates a light or laser beam 37 substantially parallel to the surface of the disk 12. The laser beam 37 impinges upon the first mirror M1 and is reflected thereby toward the disk 12.

Figure 2:
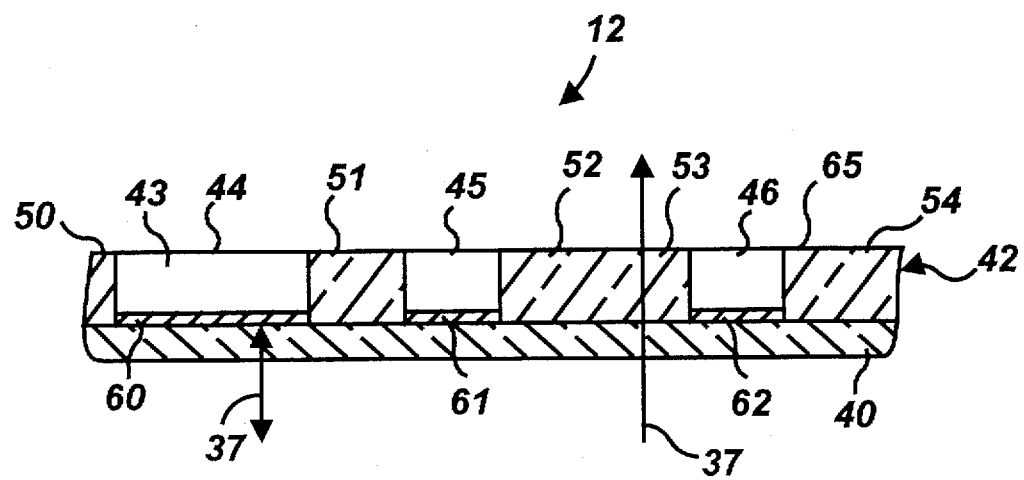
FIG. 2 is a partial cross-sectional view of an optical data storage medium according to the present invention, for use with the optical system of FIG. 1.

As further illustrated in FIG. 2 the laser beam 37 either passes through the transmissive disk 12, where it impinges on a transparent region of the disk 12, for indicating a digit "1". The laser beam 37 is diffracted (or reflected) by the disk 12 where it impinges on a diffractive (or reflective) layer or region, for indicating a digit "0". When the laser beam 37 passes through the disk 12 it is captured by the second mirror M2 and reflected thereby to the photo-detector 33 for processing.

The optical system 10 offers several advantages over existing systems. For instance, the optical system 10 eliminates the requirement for a focusing mechanism, thus reducing the number of components, simplifying the system manufacture and operation and improving its performance, and reducing its overall cost. In addition, the optical medium or disk 12 is simpler and less expensive to produce.

FIG. 2 is a cross-sectional view of the optical data storage medium or disk 12 according to the present invention. The disk 12 includes a substrate 40 which is transmissive either fully or partly to the laser beam 37 (FIG. 1). The substrate 40 provides mechanical support to the disk 12, and is generally deposited where the laser beam 37 enters the disk 12. The substrate 40 may be made of glass, polycarbonate or another suitable polymer material. In one embodiment the thickness of the substrate 40 ranges between 1 mm and 2 mm.

A data substrate 42 is then formed, deposited on, or bonded to the substrate 40. The data substrate 42 is preferably fully transmissive to the laser beam 37, but may also be partially transmissive. The data substrate 42 may be of the same material as the substrate 40. In one embodiment the substrate 40 and the data substrate 42 form a single integral layer. The partial transmissiveness of the data substrate 42 may be preferred for cost reason.

The data substrate 42 is patterned to form block regions, e.g., 43, 44, 45, 46 and pass regions, e.g., 50, 51, 52, 53, 54. The block regions do not allow the light beam to pass through. For instance block region 44 is shown as blocking light beam 37 from passing through the data substrate 42 by reflecting it. The pass regions on the other hand provide an optical path for the light beam 37 through the data substrate 42.

The blockage, or the passage of the light beam 37 through the disk 12, indicate the type of binary digit "1" or "0" recorded or stored on the disk 12. For instance, in one embodiment the block region indicates that the digit "0" has been recorded, while the pass region indicates that the digit "1" has been recorded. In another embodiment the block region indicates that the digit "1" has been recorded, while the pass region indicates that the digit "0" has been recorded.

Figure 3:
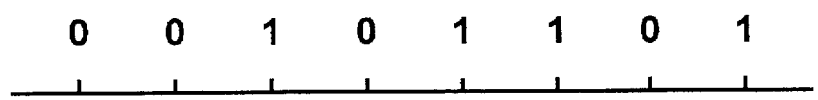
FIG. 3 represents a data pattern corresponding to block and pass regions forming part of the optical medium of FIG. 2.

FIG. 3 represents a data pattern corresponding to the block and pass regions of FIG. 2. Starting at block regions 43, 44, the data pattern indicates that two consecutive "0" digits are recorded on the disk 12. Pass region 51 shows a "1"; block region 45 reflects a "0"; the two consecutive pass regions 52, 53 indicate two consecutive digits "1"; block region 46 indicates a "0"; and pass region 54 indicates a "1". The length of a region block and that of a pass region are substantially similar, and are generally representative of a single bit of data.

In a preferred embodiment after the data substrate 42 is deposited on, and bonded to the substrate 40 the block regions are formed by etching away part of the substrate 42 to form corresponding wells. The wells may be hollow or filled with an appropriate material, and may be formed by means of well known techniques such as photo-etching, or techniques to be developed in the future. While FIG. 2 shows that the block regions are etched throughout the entire depth of the data substrate 42, it should be understood that the block regions may be etched to a predetermined depth that is less than the entire depth of the data substrate 42. In addition, while FIG. 2 shows that all the wells of the block regions have a similar depth, it should be clear that in a different embodiment the wells of the block regions may have varying depths across the surface of the disk 12.

After the wells are formed, their bottom surfaces are coated with reflective coatings, e.g., 60, 61, 62. These reflective coatings 60, 61, 62 may be made of any suitable reflective material such as aluminum metal with a thickness of approximately 50 nm. In the embodiment of FIG. 2 the upper surface 65 of the data substrate is not protected by a protective layer. In an alternative embodiment a protective layer (not shown) may be formed over the upper surface 65. The reflective coatings may be smooth to reflect the laser beam 37, or they may have roughened incident surfaces in order to diffract the laser beam 37.

Figure 4:
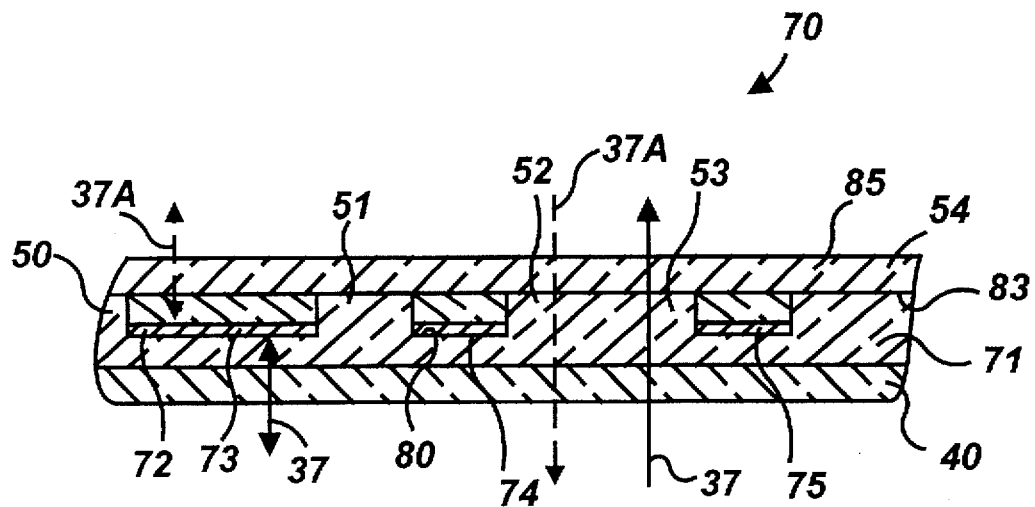
FIG. 4 is a partial cross-sectional view of another optical data storage medium according to the present invention, for use with the optical system of FIG. 1.

FIG. 4 is a cross-sectional view of an alternative embodiment for an optical data storage medium or disk 70 according to the present invention, for use with the optical system 10 of FIG. 1. The disk 70 is similar to the disk 12 and includes a substrate 40 on which a data substrate 71 with a plurality of pass regions 50–54 are formed. The data substrate 71 may be made from the same material as the substrate 40. The data substrate 71 further includes a plurality of block regions, e.g., 72, 73, 74, 75, that are patterned to reflect or diffract the stored data.

Figure 5:
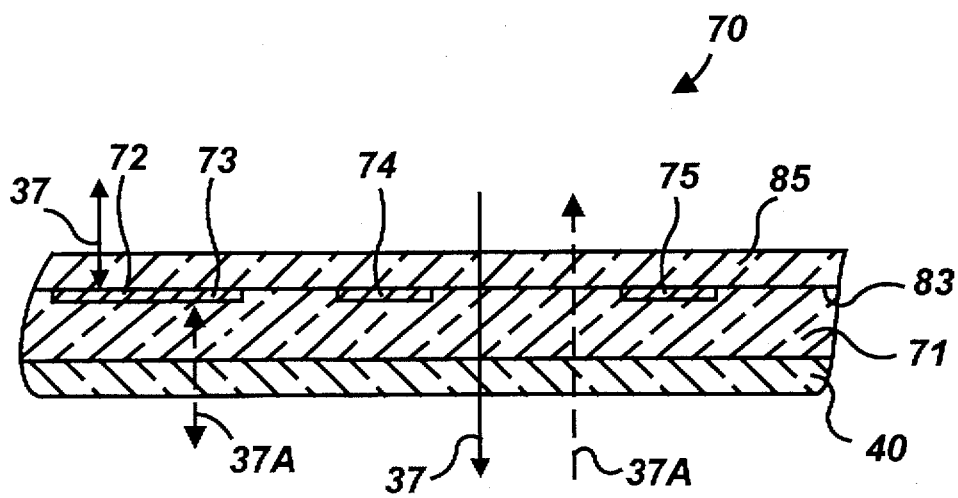
FIG. 5 is a partial cross-sectional view of yet another optical data storage medium according to the present invention, for use with the optical system of FIG. 1.

In this disk 70 the depth of some or all the block regions do not extend all the way through the data substrate 71. In a preferred embodiment each block region, for instance block region 74, is formed by depositing a reflective layer 80 at the bottom of the well, in proximity to the geometric center plane of the data substrate 71. It should however be understood that in other embodiments the reflective layer 80 may be formed at any depth of the data substrate 71. As illustrated in FIG. 5, the reflective layers 72–75 may be formed in proximity to the upper surface 83 of the disk 70. A combined design of the various depth positioning of the reflective layers 72–75 is also possible.

An optional but desirable protective layer 85 is deposited on top of the upper surface 83. This will enable the data stored on the disk 70 to be read from either side of the disk 70. The solid lines indicative of the laser beam 37 illustrate that the laser beam 37 can be incident from above the disk 70 to read the data. The dashed lines indicative of the laser beam 37A illustrate that the laser beam 37A can alternatively be incident from underneath the disk 70.

In a preferred embodiment the optical disk 12 is between 1 mm to 1.2 mm thick. It should be understood that other embodiments of the optical system 10 may employ optical disks 12 of other thicknesses.

Referring now to FIG. 1, the optical system 10 further includes a tracking control mechanism (not shown), which may utilize existing technology, such as a push-pull photo-detector. The laser source 31 irradiates a fine collimated beam preferably with a wavelength of less than 0.6micron to 0.7 micron, and a beam diameter of approximately 1 micron. Such a beam can be generated for instance by a soliton laser; a laser source using a self focusing medium or a non-linear optical medium such as a photo refractive crystal; or any other suitable light source that emits a fine collimated beam.

The two mirrors M1 and M2 are reflective. An advantage of the present invention is that the reflectivity of the mirrors M1 and M2 is not critical since the difference in the reading intensities of the digits "1" and "0" is significant. In other terms, as described above relative to FIGS. 2 and 3 the intensity of the light indicative of the digit "1" is substantially close to the intensity of the laser beam 37 which is transmitted through the disk 12 with no or minimal attenuation. On the other hand, the intensity of the light indicative of the digit "0" is zero or substantially zero since the laser beam 37 is blocked by the block regions. Thus the difference in the reading intensities of the digits "1" and "0" is substantially equal to the intensity of the laser beam 37 and is therefore significantly higher than the difference in the reading intensities realized by existing optical systems.

In one embodiment the reflectivity of the mirrors M1 and M2 can be 95 percent. Such tolerance in the reflectivity of the mirrors M1 and M2 allows for a greater tolerance in the design of the optical system 10, thus contributing to a reduction in the components and manufacturing cost.

Mirrors M1 and M2 may have any desirable shape. In one embodiment mirrors M1 and M2 are identical and have a surface area of approximately 1 mm$^2$. The distance between the centers of mirrors M1 and M2 depends on the thickness of the optical disk 12. Such distance is not critical since the present optical system 10 does not utilize a focused beam but rather a collimated beam. The laser beam 37 travels parallel to the disk surface at a height ranging from about 0.2 mm to 1.0 mm therefrom.

In a preferred embodiment the mirrors M1 and M2 are disposed symmetrically relative to the disk 12. Mirror M1 is positioned at an angle of +45 degrees relative to the surface of the disk 12, while mirror M2 is positioned at an angle of −45 degrees relative to the disk surface. In this embodiment the laser beam 37 can travel normally to the disk surface.

In another embodiment the mirrors M1 and M2 can be physically connected together to be moved independently from the laser source 31 and the photo-detector 33. In such a design, the mirrors M1 and M2 can be moved radially without much concern about alignment, since the light beam travels parallel to the surface of the disk 12.

In still another embodiment mirror M1 is positioned at an angle "$\alpha$" relative to the disk surface, and mirror M2 is positioned at an angle "$\beta$" relative to the disk surface, such that:

$$\beta = -(90° - \alpha).$$

In this alternative embodiment the mirrors M1 and M2 are not disposed in registration relative to each other, i.e., symmetrically with respect to the disk surface. Mirrors M1 and M2 are offset such that the laser beam 37 reflected by mirror M1 is captured by mirror M2 and travels parallel to the disk surface.

In yet another embodiment the mirrors M1 and M2 are rotatable and their angular dispositions relative to the disk surface remain complementary. In addition the first and second optical arms 22, 24 can move independently of each other, such that the distance between the mirrors M1 and M2 varies in order for the laser beam 37 reflected by mirror M2 to travel along a path parallel to the disk surface.

Figure 6:
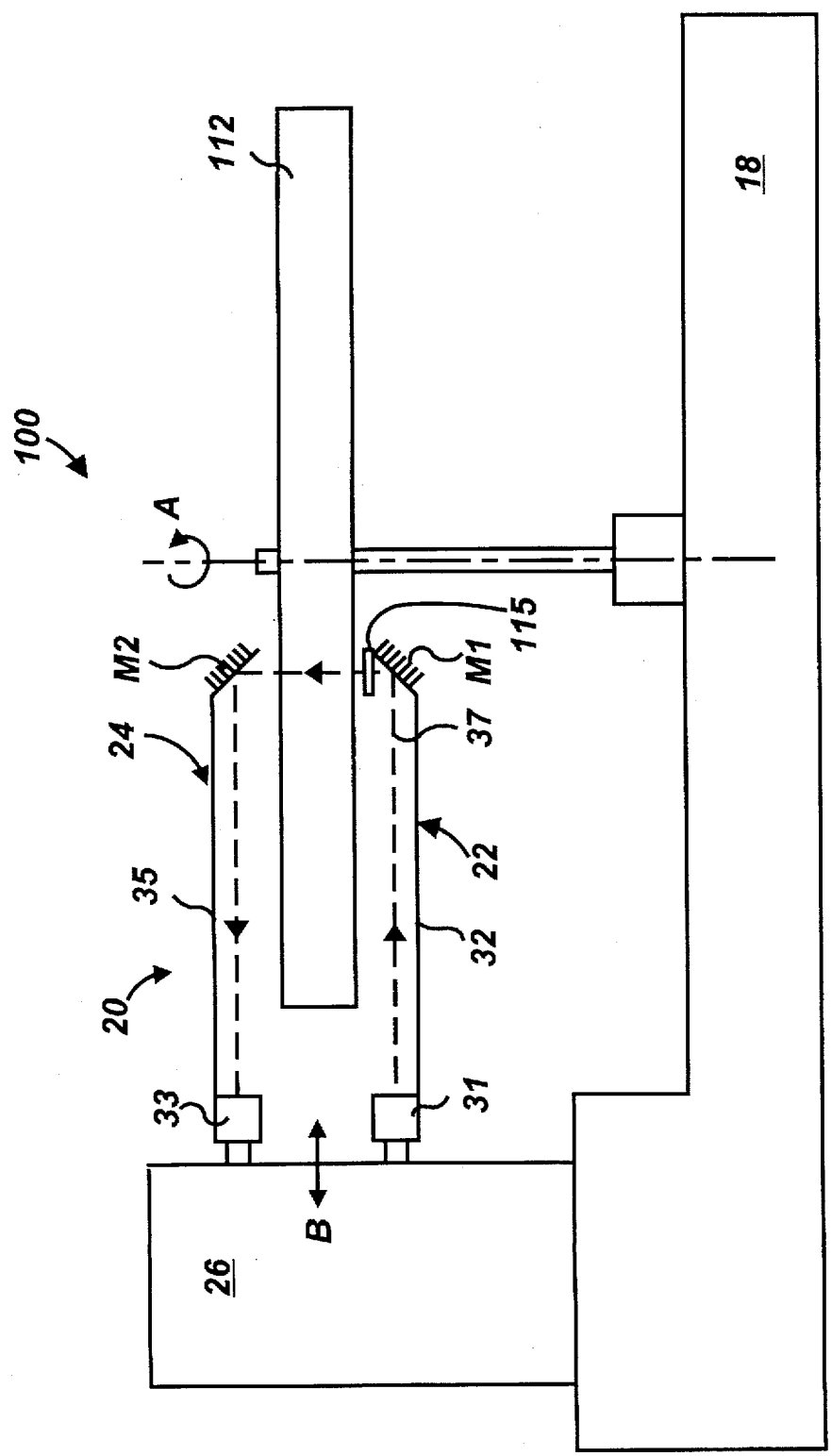
FIG. 6 is a schematic diagram of a magneto-optic system according to the present invention.

With reference to FIG. 6, it illustrates a magneto-optic system 100 according to the present invention. The system 100 uses a similar basic design to that of the system 10 (FIG. 1) and includes several similar components. The operation of the system 100 is relatively similar to that of the system 10 and is further capable of writing data onto a magneto-optic disk 112.

The system 100 includes a magnet 115, such as an electromagnet or a permanent magnet, for writing data onto the disk 112. The magnet 115 is cylindrically shaped, and is hollow along its axial length for allowing a light beam to pass through the magnet 115. The magnet 115 is secured to one end of mirror M1 such that the laser beam 37 reflected by mirror M1 passes through the hollow center of the magnet 115. The magnet 115 does not have a significant effect when the system 100 reads data already recorded on the disk 112. When the system 100 is in the process or reading data it functions in the same manner as described above in relation to system 10.

When it is desired to write onto the disk 112, the laser source 31 increases the intensity of the laser beam sufficiently so that it heats a magneto-optic data substrate 154 (FIG. 7) of the disk 112 to a critical temperature, around its Curie temperature, as is known in the field. As the critical temperature is reached, the magnetic domain field strength of the magneto-optic data substrate 154 is reduced to close to zero. An external magnetic field is then applied to the magneto-optic data substrate 154 using the magnet 115 to change the domain to record a one or a zero.

The arrows in the magneto-optic data substrate 154 are representative of an illustrative magnetic domain that corresponds to the data pattern of FIG. 3.

Figure 7:
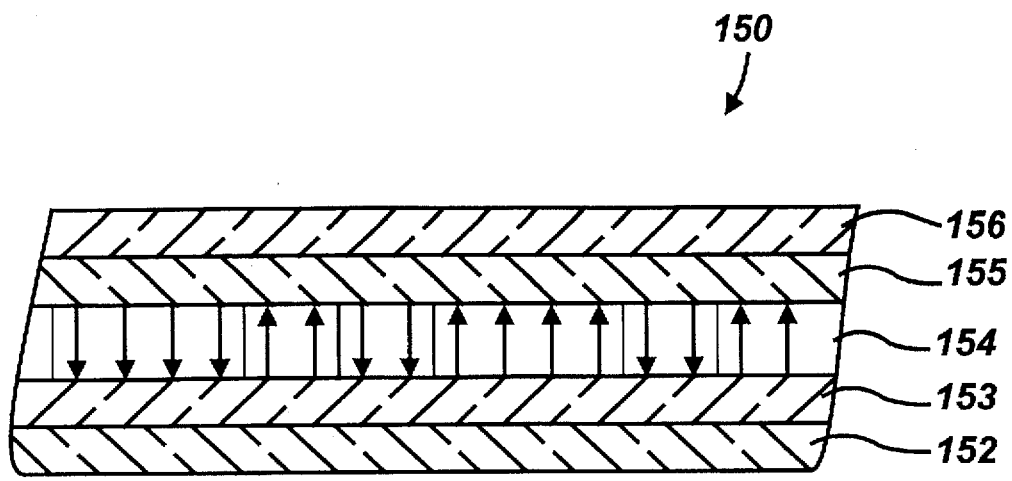
FIG. 7 is a partial cross-sectional view of a magneto-optic data storage medium according to the present invention, for use with the magneto-optic system of FIG. 6.

With reference to FIG. 7 the magneto-optic disk 150 is either fully or partially transmissive to the light beam 37. The magneto-optic disk 150 is formed of a plurality of generally transmissive superposed layers. The first layer is a substrate 152 which may be similar in composition to the substrate 40 of FIG. 1. A data magneto-optic data substrate 154 is formed or deposited on the substrate 152. In a preferred embodiment the data magneto-optic data substrate 154 is, or may be coated with one of the various writeable optical storage films such as WORM media, or one of the various erasable optical storage films such as phase change, or magneto-optical (WREM) media.

Any type of transmissive phase change films, substrates or rare earth transition metals may be used as the magneto-optic data substrate 154, or as part of the magneto-optic data substrate 154. In one embodiment two or more layers of different transmissive phase change films or substrates may be superposed to form the magneto-optic data substrate 154. The magneto-optic data substrate 154 may be vacuum deposited by known sputtering techniques, onto the substrate 152, to a thickness preferably ranging between 5 nm and 60 nm.

An optional light transmissive protective undercoat 153 may be deposited between the substrate 152 and the magneto-optic data substrate 154. This protective undercoat 153 may be for instance made of aluminum nitride (AlN) or any other suitable material. A light transmissive protective overcoat 155 may be formed on top of the magneto-optic data substrate 154. The overcoat 155 may have a similar composition to that of the undercoat 153, and is approximately 20 nm thick. Another transmissive protective layer 156 may optionally be formed on top of the overcoat 155. The protective layer 156 may be made of glass, plastic, or any other suitable polymer material.

Figure 8:
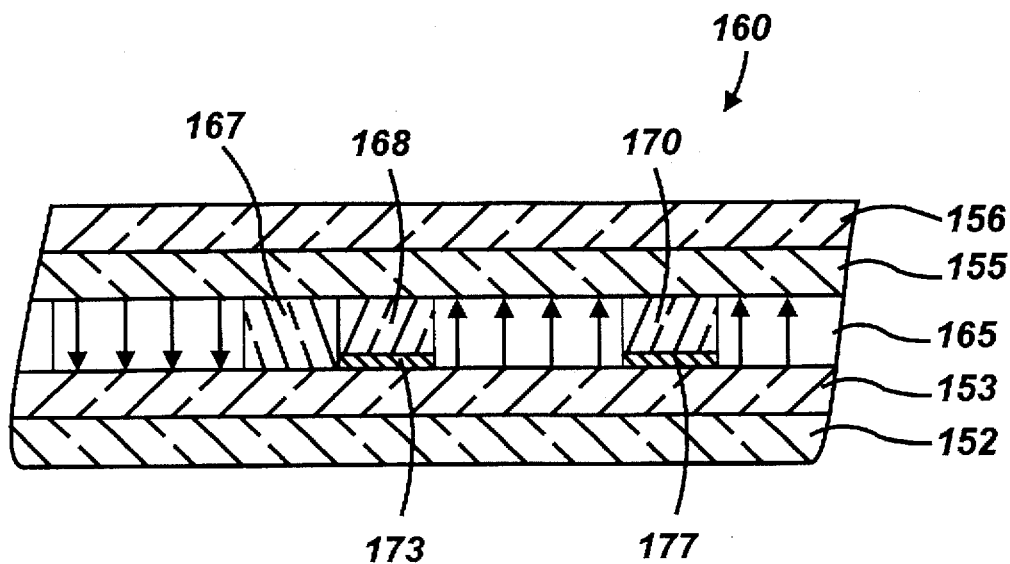
FIG. 8 is a partial cross-sectional view of a combination optical and magneto-optic data storage medium according to the present invention, for use with the optical system of FIG. 1 and the magneto-optic system of FIG. 6.

FIG. 8 illustrates yet another data storage medium or disk 160 which is a combination of the optical disk 12 and the magneto-optic disk 112, made according to the present invention. The disk 160 may be used with any of the optical systems, i.e., the optical system of FIG. 1 and the magneto-optic system of FIG. 6, described herein.

The disk 160 is similar to the magneto-optic disk 150 of FIG. 7 but utilizes a combination optical/magneto-optic data substrate 165 instead of the magneto-optic data substrate 154. Like the data substrate 42 of FIG. 2, the data substrate 165 includes a pattern of pass regions (i.e., 167) and block regions (i.e., 168, 170). As previously described in relation to the data substrate 42 of FIG. 2, the block regions 168, 170 include light reflective layers 173, 177, respectively. Similar to the data substrate 154 of FIG. 7, the data substrate 165 is formed of one or more magneto-optic layers for generating a magnetic domain illustrated by the arrows.

The data substrate 165 includes a combination of ROM, WORM, and/or WREM erasable media. In one design different types of materials are formed on designated tracks of the disk 160. As a result, the disk 160 may be used as ROM, WORM and/or WREM media.

It should be understood that the geometry, compositions, and dimensions described herein may be modified within the scope of the invention. For instance, the inventive concept of the present invention may be extended to optical and magneto-optic media with multiple data layers. Other modifications may be made when implementing the invention for a particular environment.

Figure 9:
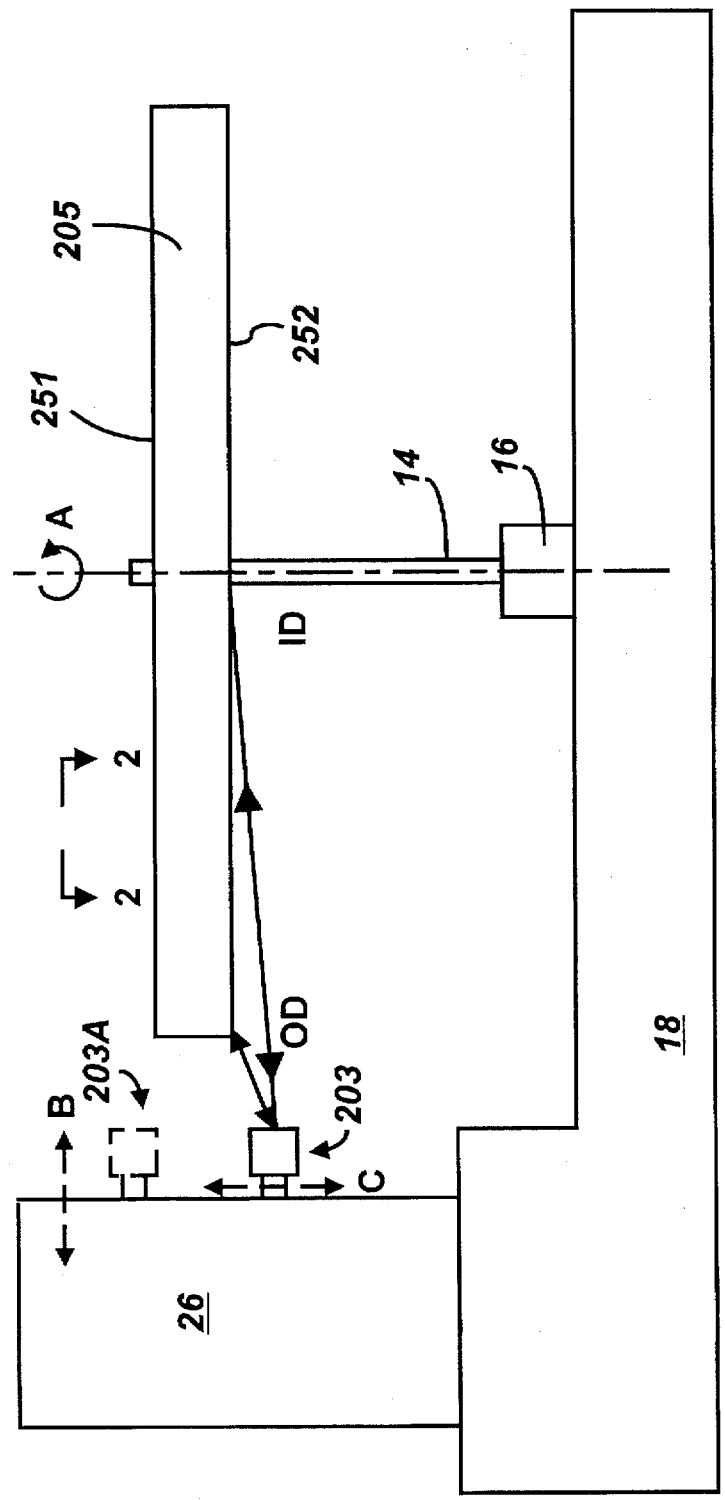
FIG. 9 is a schematic view of an optical data storage system according to the present invention.

FIG. 9 is a schematic view of an optical data storage system 200 according to the present invention. The system 200 includes an optical head 203 and a data storage medium such as a CD ROM disk 205. The disk 205 is removably mounted on a spindle 14. The spindle 14 is rotatably secured to a motor 16, which, in turn, is secured to a chassis 18. The motor 16 rotates the spindle 14 as well as the disk 200 around an axis in the direction of the arrow A.

The optical head 203 is mounted on a platform 26, which, in turn, is secured to the chassis 18. An important feature of the present invention is that the head 203 does not move mechanically but instead steers or diffracts a light beam, such as the laser beam 37 by holographic or acousto-optical methods. In addition, since it would be desirable to reduce the overall size of the system 200 so that it has near planar dimensions, the optical head 203 is positioned as close as possible to the disk 205, such that the angle "Θ" (FIG. 10A) formed between the laser beam 37 and a plane parallel to the land (i.e., 220) surface is small (i.e., a few degrees), but is also large enough so that the laser beam 37 is capable of sweeping the entire surface of the disk 205, between its inner diameter track (ID) and its outer diameter track (OD) by steering or diffracting the laser beam 37 for a few degrees. The closer the head 203 is to the disk 205, the smaller the steering or diffraction angle becomes.

Figure 10A:
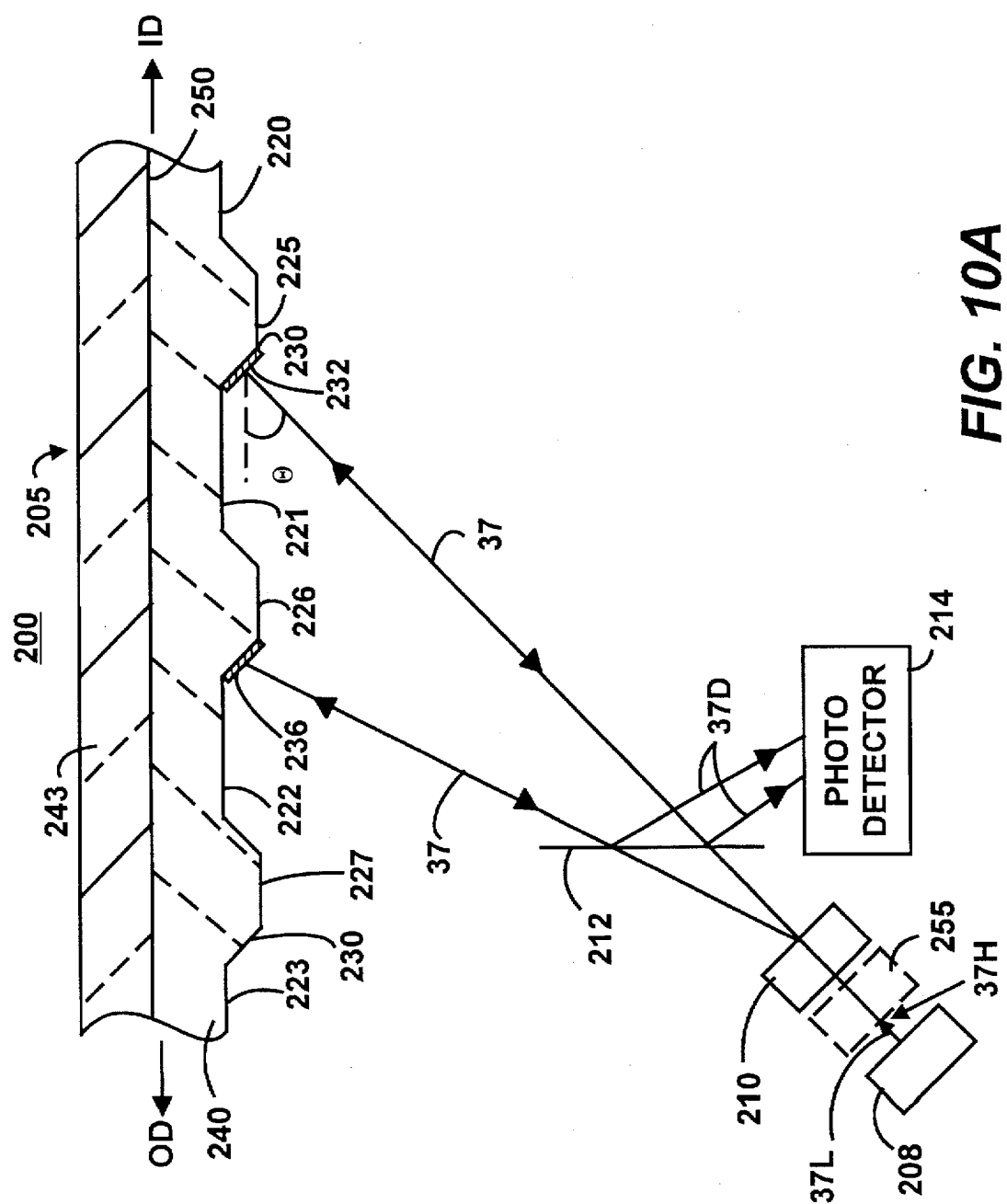
FIG. 10A is an enlarged view of part of the optical data storage system of FIG. 1 showing an exaggerated, detailed, cross-sectional view along line 2—2 of a data storage medium used in the optical data storage of FIG. 1.

With further reference to FIG. 10A, the optical head 203 generally includes a light source such as a laser source 208, a beam steering element 210, a beam splitter 212, and a photo-detector 214. The disk 205 contains a pattern of spiral, or alternatively concentric lands (e.g., 220, 221, 222, 223) and adjacent pits (e.g., 225, 226, 227). Each pit is continuous and defines a concentric circle along a track. Similarly, each land is continuous and defines a concentric circle along a track.

Each pit, for instance the pit 225, includes a ridge 230 facing the optical head 203, which is generally normal to an incident laser beam 37. When it is desired to record a data bit, for instance a "1" onto the disk 205, the corresponding ridge 230 is coated with a reflective layer 232. As a result, the absence of the reflective layer 232 on the ridge 230, as is illustrated relative to the pit 227, indicates a "0" data bit.

In a preferred mode of operation, the optical head 203 is fixedly mounted onto the platform 26, and remains stationary throughout the entire operation of the optical system 200. The laser source 208 generates the light or laser beam 37 which impinges upon, and is reflected by the ridge 230. If the ridge 230 were not coated with a reflective layer 232 as is illustrated relative to the pit 227, then the light beam 37 is diffracted by the pit 227. The difference in the reflectivity of the light beam 37 by the coated and uncoated ridges 230 is therefore noticeably great and provides a clear reading of the recorded data.

The optical system 200 offers several advantages over existing systems. For instance, the optical system 200 eliminates the requirement for a focusing mechanism, thus reducing the number of components, simplifying the system manufacture and operation and improving its performance, and reducing its overall cost. In addition, since the optical head 203 is stationary the system 200 is more stable and generates less noise thus optimizing the signal to noise ratio.

The various components of the optical system 200 will now be described in more detail. FIG. 10A provides a cross-sectional view of the optical data storage medium or disk 205 according one embodiment of the present invention. The disk 205 includes a data substrate 240 formed on a lower surface of the disk 205. The data substrate 240 may be made of any suitable material such as glass, polycarbonate or another suitable polymer material. An optional undercoat layer (not shown) may be formed underneath the data substrate 240 to provide added mechanical support and protection. A suitable overcoat protective layer 243 made of known material is formed on top of the data substrate 240. An optional protective undercoat layer is preferably formed on the surface of the data substrate 240. The overcoat layer 243, and/or the undercoat layer may be made for instance of aluminum nitride (AlN) or any other suitable material to provide adequate protection to the data substrate 240.

The data substrate 240 is patterned, for instance by photoetching, to form the lands 220, 221, 222, 223 and the pits 225, 226, 227. Each land is generally flat and may have a length of approximately equal to, or less than one bit length (i.e., between 0.7 μm and 4 μm), though other dimensions are also foreseeable. In one embodiment the lands are formed for instance by first patterning the data substrate 240 and then by removing regions of the data substrate 240, such as by photo-etching or other known techniques. In one embodiment all the lands are formed at the same or similar depth or distance relative to the upper surface 250 of the data substrate 240. It should however be clear that the pits may be formed at different depths relative to the upper surface 250. While the lands are illustrated to be flat, it should be clear that some or all of the lands may be non-planar or with roughened or patterned light incident surfaces.

The pits are regions that are embossed or raised relative to the adjacent lands. In one embodiment each pit is formed of an outer ridge, such as the ridge 230, which is angled relative to the adjacent land, i.e., 221, 222, 223. The angular disposition, that is the angle defined between the surface of the ridge 230 and the adjacent land 220 (i.e., approximately equal to "180°–Θ"), where the angle Θ may be set to, or exceeds a few degrees, such that the ridge 230 is substantially normal (i.e., perpendicular) to an incident laser beam 37.

The surface of the ridge 230 may be flat and smooth, or alternatively it may be roughened, so that when it is not coated with the reflective layer 232 the light beam is diffracted by the ridge 230, thus further increasing the difference in reflectivity of the laser beam 37 between the coated ridges and the uncoated ridges. The ridges 230 are selectively coated with reflective layers, such as 232, 236 to record desired data bits. The reflective layers may be made of any suitable reflective material such as aluminum metal.

The reflective layers have a generally flat reflective surface that is generally parallel to the ridge 230. As a result, when the incident laser beam 37 impinges upon the reflective layers 232, 236, it is reflected along substantially the same optical path as the incident laser beam 37, back toward the optical head 203 where its intensity is detected and as it will be described later. The optical system 200 further includes a tracking control mechanism (not shown), which may utilize existing technology, such as a push-pull photodetector.

In one embodiment all the pits 225, 226, 227 are substantially similar in shape, dimensions and configuration. However, in another embodiment the pits are not similar. For instance, the angular disposition (i.e., approximately equal to "180°–Θ") of the outermost pits along the outer diameter track (OD) is different than the angular disposition of the innermost pits along the inner diameter track (ID). In addition, the angular dispositions of the intermediate pits between the outer and inner diameter tracks (OD) and (ID), respectively, vary. For instance, in one embodiment the angular dispositions of the intermediate pits gradually and progressively increase between the angular dispositions of the outer and inner diameter tracks (OD) and (ID), respectively.

Referring now to the optical head 203, the laser source 208 emits a fine collimated beam preferably with a wavelength of less than 0.6 micron to 0.7 micron and a beam diameter of approximately 1 micron. Such a beam can be generated for instance by a soliton laser; a laser source using a self focusing medium or a nonlinear optical medium such as a photo-refractive crystal; or any other suitable light source that emits a fine collimated beam.

The beam steering element 210 causes a laser beam 37L emited from the laser source 208 to be swept optically across the entire (or alternatively across one or more selected segments) of the disk 205. This sweeping action is carried out using a holographic, an acousto-optical or a combination holographic/acousto-optical sweeping technique.

When holographic sweeping is used, the beam steering element 210 includes a holographic crystal inside of which a holographic grating is recorded by means of laser beams 37L and 37H each having a predetermined wavelength. The laser beam 37L from the laser source 208 is deflected by the grating, and, by changing the wavelength of the laser beams 37L and 37H, the holographic grating changes accordingly, causing the resulting laser beam 37 to be steered between the outer and inner diameter tracks OD and ID, respectively, as desired. The holographic grating, recording, and deflecting techniques are generally known and described in "Optical Beam Deflection Using Dynamic Volume Reflection Gratings" in Optical and Quantum Electronics 21 (1989), pages 151–154; G.T. Sincerbox and G. Rosen, Applic. Opt. 22 (1983), 690; and J. P. Herriau, A. Delboulbe, J. P. Huignard, G. Rosen, and G. Pauliat, IEEE J. Lightwave Technol. LT-4 (1986) 905, all of which are incorporated herein by reference.

When acousto-optical sweeping is used, the beam steering element 210 includes an acoustic crystal or a Bragg cell composed for instance of $LiNbO_3$, which deflects the laser beam 37L when an acoustic wave (indicated by the reference numeral 37H) impinges upon the acoustic crystal, causing the resulting laser beam 37 to be steered between the outer and inner diameter tracks OD and ID, respectively, as desired. The acousto-optical technique is known and described in "Scanning Beam Collimation Method for Measuring Dynamic Angle Variations Using an Acousto-Optic Deflector" by Lijiang Zeng, et al., 1662 Opt. Eng. 35(2) 1662–1663 (Jun. 1996), which is incorporated herein by reference.

The incident beam 37, or a part thereof is reflected by either the reflective layer 232 or the uncoated ridge 230, back toward the optical head 203 and impinges upon the beam splitter 212. The beam splitter 212 separates the incident beam 37 and the beam reflected by the disk 205, and deflects the reflected beam into a beam 37D which is detected by the photo-detector 214. The photo-detector 214 detects the intensity of the deflected laser beam 37D. If the intensity of the deflected beam 37D is greater than a predetermined level, the optical head 203 determines that the incident laser beam 37 was reflected by a ridge 230 with a reflective layer 232, and as a result reads a predetermined data bit, such as a "1". If on the other hand the intensity of the deflected beam 37D is less than a predetermined level, the optical head 203 determines that the incident laser beam 37 was not reflected by a ridge 230 with a reflective layer 232, and as a result reads a predetermined data bit, such as a "0".

With reference to FIG. 9, the optical system 200 may include another optical head 203A positioned above an upper surface 251 of the disk 205 so that the optical heads 203 and 203A may now read data from the lower surface 252 of the disk 205 as well as the upper surface 251 of the disk 205, respectively. In such an embodiment the upper surface 251 is patterned with lands and pits as described herein in relation to the lower surface 252.

In another embodiment the optical system 200 includes one or two optical heads 203, 203A, each capable of translating up and down vertically, in the direction of the arrow C. In still another embodiment the platform 26 may slide laterally in the direction of the arrow B. In yet another embodiment one or both optical heads 203, 203A are capable of sliding vertically in the direction of the arrow C, and the platform 26 is capable of sliding laterally in the direction of the arrow B.

In a further embodiment, the reflective layers 232, 236 (FIG. 10A) are not necessarily flat and may be concave or convex, so long as the incident laser beam 37 is reflected generally back toward the optical head 203 to be detected thereby.

In a further embodiment the laser source 208 and the laser steering element 210 are disposed remotely from the beam splitter 212 and photo-detector 214 so that the incident laser beam 37 is not necessarily normal to the reflective layers 232, 236 provided the reflected laser beam impinges upon the beam splitter 212 for detection by the photo-detector 214.

In another embodiment the optical system 200 further includes an optional isolator 255 positioned between the laser source 208 and the beam steering element 210 so as to attenuate any residual laser beam which is reflected back toward the laser source 208.

In still another embodiment the beam steering function is carried out holographically as well as by means of acousto-optical methods. In such a design, the laser beam 37L from the laser source 208 is first deflected using the acousto-optical method described herein, and the deflected laser beam is further deflected using the holographic technique described herein. Such double deflection will permit the optical head 203 to be positioned in closer proximity to the disk 205.

Figure 10B:
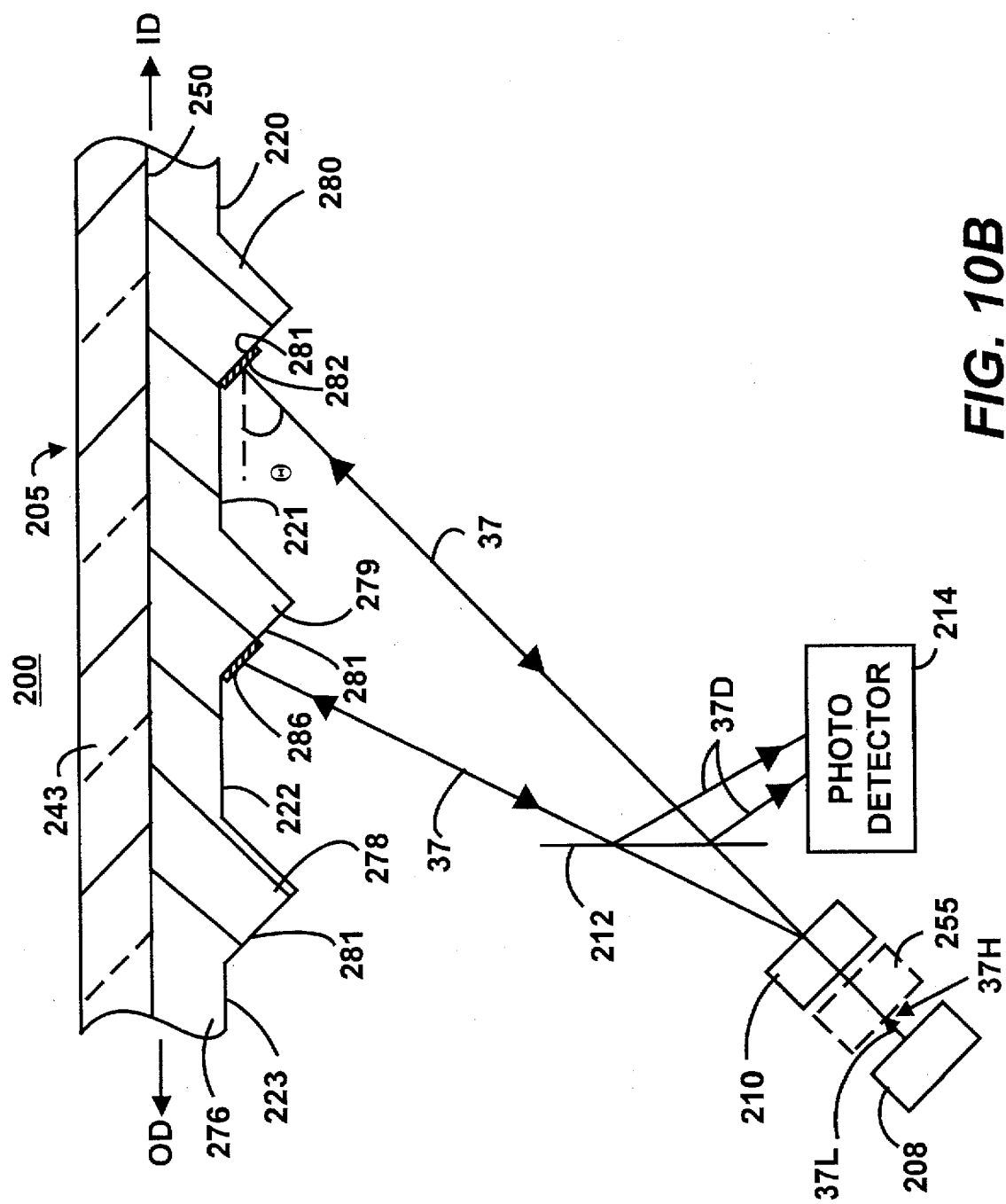
FIG. 10BB is an enlarged view of part of the optical data storage system of FIG. 1 showing an exaggerated, detailed, cross-sectional view along line 2—2 of another data storage medium used in the optical data storage of FIG. 1.

FIG. 10B illustrates another configuration of a data layer 276 forming part of the disk 205. The data layer 276 has a moth eye configuration wherein the pits, i.e., 278, 279, 280 have a conical configuration (i.e., a triangular cross-section). Each pit includes a ridge, i.e., 281, similar to ridge 230, which ridge 281 may or may not be coated with a reflective coating, i.e., 282, 286, which reflective coating has a substantially similar function and design to the reflective coatings 232, 236 shown in FIG. 10A. The reflective coating, i.e., 282,286, may cover the entire surface of the ridges 230 or a selected portion thereof.

It should be understood that the geometry, compositions, and dimensions described herein may be modified within the scope of the invention. For instance, the inventive concept of the present invention may be extended to optical and magneto-optical media with multiple data layers. Furthermore, the optical head 203 may alternatively or additionally be moved pivotally. Other modifications may be made when implementing the invention for a particular environment.

Figure 11:
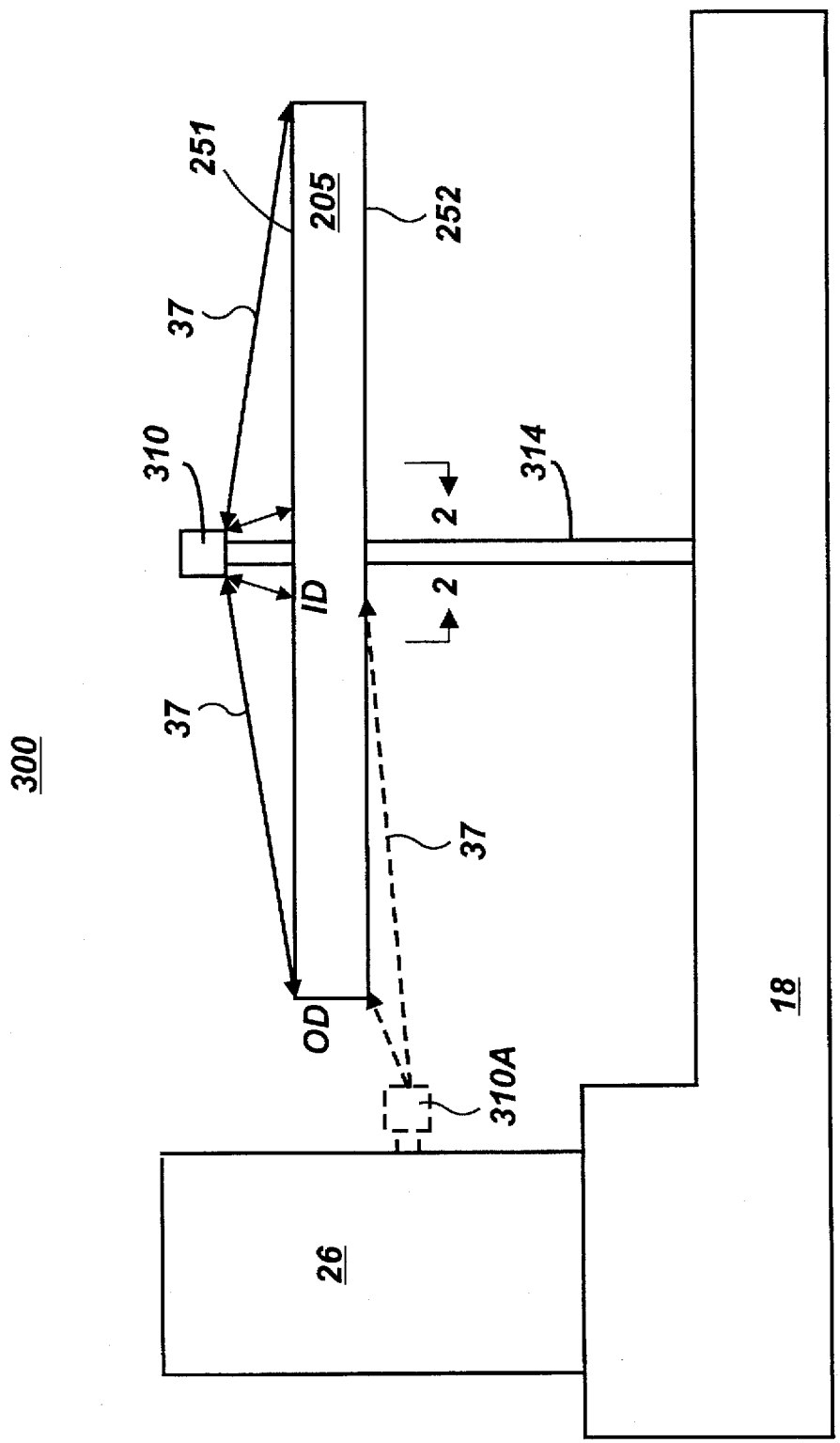
FIG. 11 is a schematic view of an optical data storage system according to the present invention.

FIG. 11 is a schematic view of an optical data storage system 300 according to the present invention. The system 300 includes an optical head 310 and a data storage medium such as a CD ROM disk 205. The disk 205 is removably mounted on an axle 314. The axle 314 is fixedly secured to a chassis 18. In an alternative embodiment the optical head 310 may be connected to a platform 26 secured to the chassis 18 or to any other suitably located support structure.

An important feature of the present invention is that neither the optical head 310 nor the disk 205 move mechanically. Instead, an optical beam, such as a light or laser beam 37 is steered or diffracted by holographic or acousto-optical methods. In addition, since it would be desirable to reduce the overall size of the system 300 so that it has near planar dimensions, the optical head 310 may be positioned as close as possible to the disk 205, such that the angle "Θ" (FIG. 12) formed between the laser beam 37 and a plane parallel to the land (i.e., 220) surface is small (i.e., a few degrees), but is also large enough so that the laser beam 37 is capable of sweeping the entire surface of the disk 205, between its inner diameter track (ID) and its outer diameter track (OD) by steering or diffracting the laser beam 37 by a few degrees. The closer the optical head 310 is to the disk 205, the smaller the steering or diffraction angle becomes.

Figure 12:
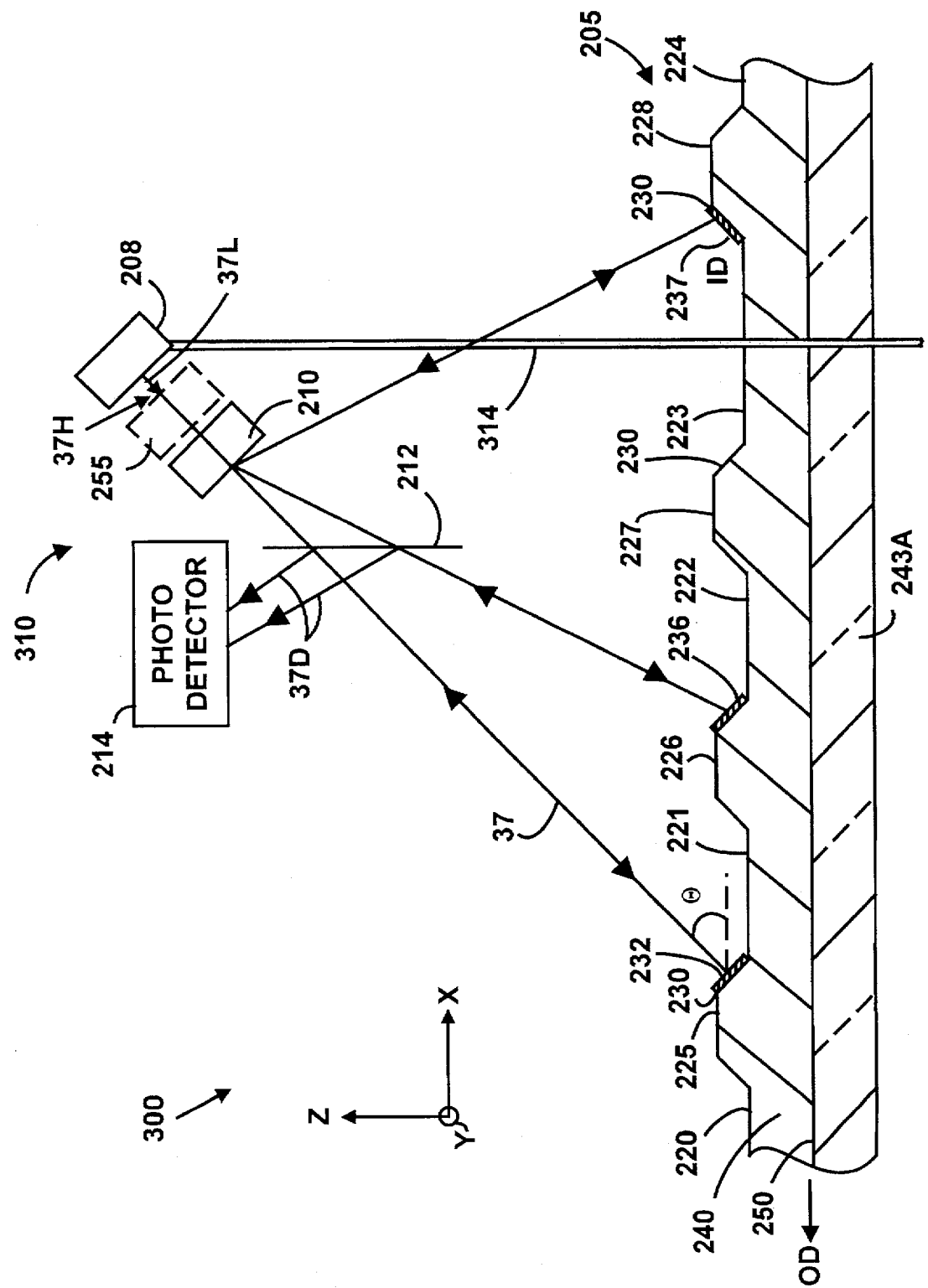
FIG. 12 is an enlarged view of part of the optical data storage system of FIG. 11 showing an exaggerated, detailed, cross-sectional view of a data storage medium used in the optical data storage of FIG. 11 along line 2—2.

With further reference to FIG. 12, the optical head 310 generally includes an optical source such as a laser source 208, a beam steering element 210, a beam splitter 212, and a photo-detector 214. The disk 205 contains a pattern of spiral, or alternatively concentric lands (e.g., 220, 221, 222, 223, 224) and pits (e.g., 225, 226, 227, 228). Each pit is continuous and defines a concentric circle along a track. Similarly, each land is continuous and defines a concentric circle along a track.

Each pit, for instance the pit 225, includes a ridge 230 which is generally normal to an incident laser beam 37. When it is desired to record a data bit, for instance a "1" onto the disk 205, the corresponding ridge 230 is coated with a reflective layer 232. As a result, the absence of the reflective layer 232 on the ridge 230, as is illustrated relative to the pit 227, indicates a "0" data bit.

In a preferred mode of operation, the optical head 310 remains stationary throughout the entire operation of the optical system 300. The laser source 208 generates the light or laser beam 37 which impinges upon, and is reflected by the ridge 230. If the ridge 230 were not coated with a reflective layer 232 as is illustrated relative to the pit 227, then the light beam 37 is partly reflected or diffracted by the pit 227. The difference in the reflectivity of the light beam 37 by the coated and uncoated ridges 230 is therefore noticeably great and provides a clear reading of the recorded data bits.

The optical system 300 offers several advantages over existing systems. For instance, the optical system 300 eliminates the requirement for a focusing mechanism, thus reducing the number of components, simplifying the system manufacture and operation, improving its performance, and reducing its overall cost. In addition, since the optical head 310 and the disk 205 are stationary the system 300 is more stable and generates less noise thus optimizing the signal to noise ratio.

The various components of the optical system 300 will now be described in more details. FIG. 12 provides a cross-sectional view of the optical data storage medium or disk 205 according one embodiment of the present invention. The disk 205 includes a data substrate 240. The data substrate 240 may be made of any suitable material such as glass, polycarbonate or another suitable polymer material. An optional overercoat protective layer (not shown) may be formed on top of the data substrate 240. A suitable protective undercoat layer 243A is formed underneath the data substrate 240, to provide added mechanical support and protection. The undercoat layer 243, and/or the overcoat layer may be made for instance of aluminum nitride (AlN) or any other suitable material to provide adequate protection to the data substrate 240.

The data substrate 240 is patterned, for example by photoetching, to form the lands 220, 221, 222, 223, 224 and the pits 225, 226, 227, 228. Each land is generally flat. In one embodiment the lands are formed for instance by first patterning the data substrate 240 and then by removing regions of the data substrate 240, such as by photo-etching or other known techniques. In one embodiment all the lands are formed at the same or similar depth or distance relative to the surface 250 of the data substrate 240. It should however be clear that the pits may be formed at different depths relative to the surface 250. While the lands are illustrated to be flat, it should be clear that some or all of the lands may be non-planar or with roughened or patterned light incident surfaces.

The pits are regions that are embossed or raised relative to the adjacent lands. In one embodiment each pit is formed of an outer ridge, such as the ridge 230, which is angled relative to the adjacent land, i.e., 221, 222, 223. The angular disposition, that is the angle defined between the surface of the ridge 230 and the adjacent land 220 (i.e., approximately equal to "180°−Θ"), where the angle Θ may be set to, or exceeds a few degrees, such that the ridge 230 is substantially normal (i.e., perpendicular) to an incident laser beam 37.

In a preferred embodiment, the angles formed between the ridges 230 and the adjacent lands (or the data substrate surface 250) changes with the position of the tracks along which the pits are formed in order to maintain a substantially 90 degree angle with the incident optical beam 37. For instance, the angular disposition (i.e., approximately equal to "180°−Θ") of the outermost pits along the outer diameter track (OD) is different than the angular disposition of the innermost pits along the inner diameter track (ID). In addition, the angular dispositions of the intermediate pits between the outer and inner diameter tracks (OD) and (ID), respectively, vary. For instance, in one embodiment the angular dispositions of the intermediate pits gradually and progressively increase between the angular dispositions of the outer and inner diameter tracks (OD) and (ID), respectively. In another embodiment all the pits 225, 226, 227, 228 are substantially similar in shape, dimensions and configuration.

The surface of the ridge 230 may be flat and smooth, or alternatively it may be roughened, so that when it is not coated with the reflective layer 232 the light beam is diffracted by the ridge 230, thus further increasing the difference in reflectivity of the laser beam 37 between the coated ridges and the uncoated ridges. The ridges 230 are selectively coated with reflective layers, such as 232, 236, 237 to record desired data bits. The reflective layers may be made of any suitable reflective material such as aluminum metal.

The reflective layers 232, 236, 237 have a generally flat reflective surface that is generally parallel to the ridge 230. As a result, when the incident laser beam 37 impinges upon the reflective layers 232, 236, 237 it is reflected along substantially the same optical path as the incident laser beam 37, back toward the optical head 310 where its intensity is detected and as it will be described later. The optical system 300 further includes a tracking control mechanism (not shown), which may utilize existing technology, such as a push-pull photodetector.

Referring now to the optical head 310, the laser source 208 emits a fine collimated beam preferably with a wavelength of less than 0.6 micron to 0.7 micron and a beam diameter of approximately 1 micron. Such a beam can be generated for instance by a soliton laser; a laser source using a self focusing medium or a non-linear optical medium such as a photo-refractive crystal; or any other suitable light source that emits a fine collimated beam.

The beam steering element 210 causes a laser beam 37L from the laser source 208 to be swept optically across the entire (or alternatively across one or more selected segments) of the disk 205. This sweeping action is carried out using a holographic, an acousto-optical or a combination holographic/acousto-optical sweeping technique.

Figure 13:
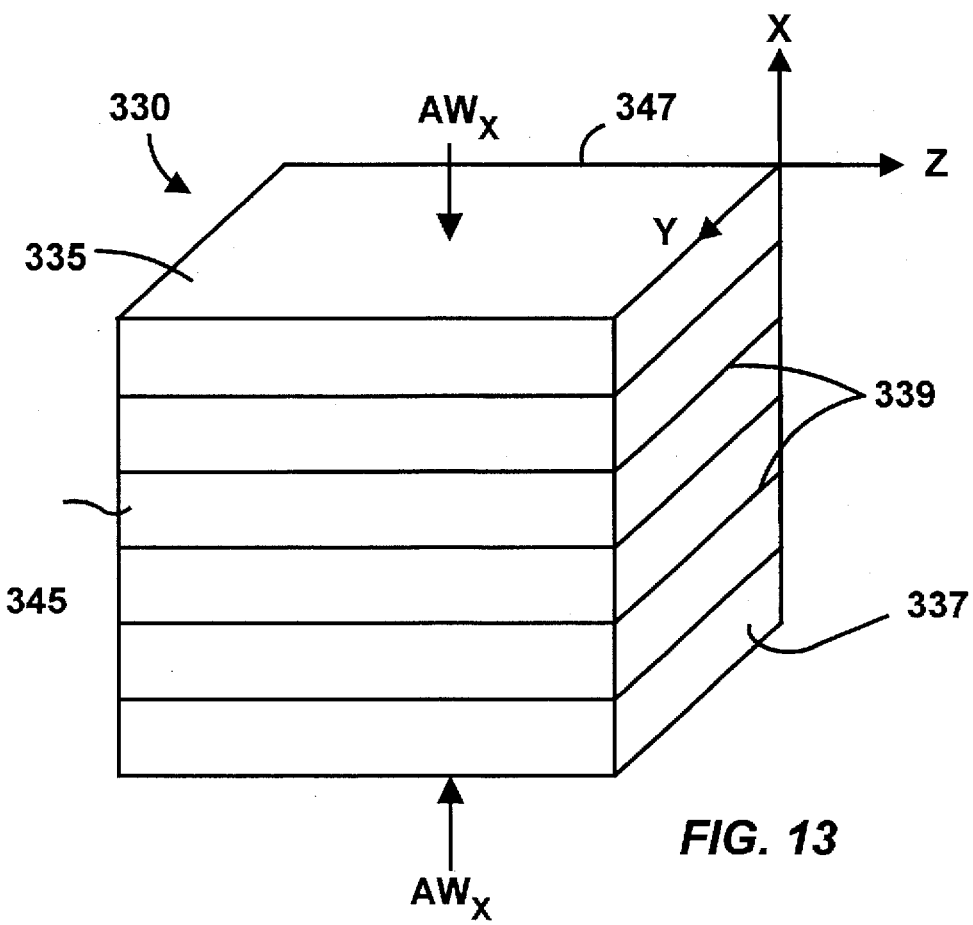
FIG. 13 is an enlarged perspective view of an acousto-optical crystal or photo-refractive crystal forming part of a beam steering element of the optical storage system of FIGS. 11 and 12, for controlling an optical beam deflection in the X direction.

One such acousto-optical sweeping technique according to the present invention will now be described in relation to FIGS. 13 through 16. FIG. 13 illustrates an acousto-optical crystal forming part of the beam steering element 210 of the optical storage system 300 of FIGS. 11 and 12, for controlling the sweeping or deflection of the optical or laser beam 37L emanating from the laser source 208, in an X direction.

Figure 14:
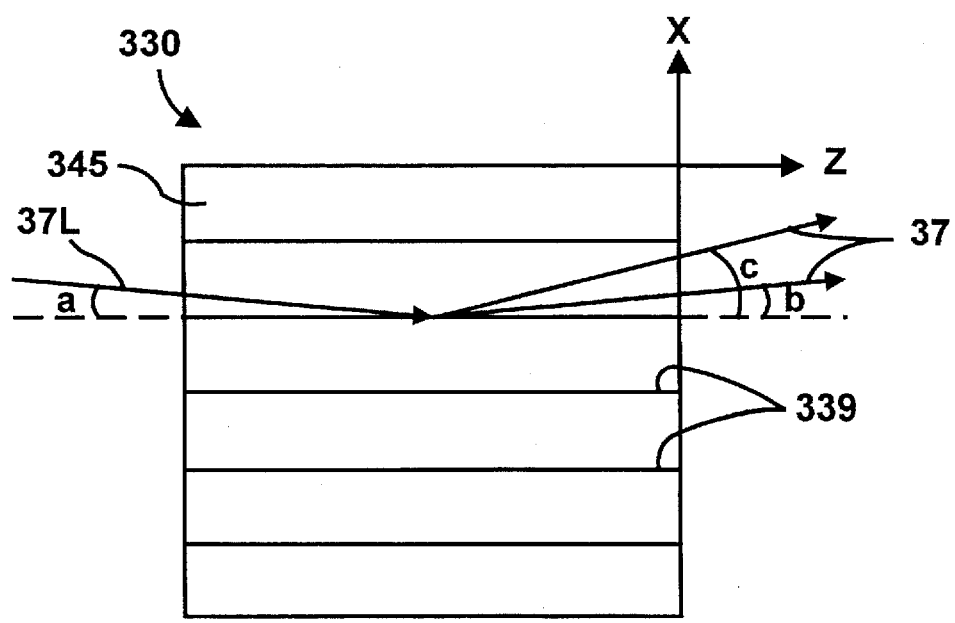
FIG. 14 is a front plan view of the acousto-optical crystal or photo-refractive crystal of FIG. 13.

A crystal 330 may be an elasto-optical crystal used in conjunction with the acousto-optical sweeping technique, or a photo-refractive crystal used in conjunction with the holographic sweeping technique. When the crystal 330 is an elasto-optic crystal as used in a Bragg cell, it may be composed for example of $LiNbO_3$. The acousto-optical crystal 330 deflects the laser beam 37L (FIG. 14). Two acoustic waves AWx have the same or substantially similar wavelength, intensity or amplitude, as they may originate from the same acoustic source and are thereafter split into two acoustic waves AWx.

The acoustic waves AWx impinge simultaneously upon the crystal 330 from two opposite sides 335, 337, along the X direction. The acoustic waves AWx are generally normal to the sides 335, 337. The acoustic waves AWx interfere and form an acoustic standing wave pattern (or grating) which is normal to the incident acoustic waves AWx. Due to the elasto-optic effect of the crystal 330, the optical refractive index "n" of the crystal 330 will be modulated by the interference pattern of the acoustic waves AWx.

The optical refractive index "n" depends on the density of the material forming the crystal 330, and results in an optical grating inside the crystal 330, which is referred to as an optic phase grating 339. The optic phase grating 339 includes patterns that are normal to the acoustic waves AWx, and causes the impinging optical beam 37L to be deflected in the X-direction as the optical beam 37.

As illustrated in FIG. 14, the optical beam 37L defines an angle of incidence "a" relative to the patterns of the optic phase grating 339, and the deflected optical beam 37 defines an angle of deflection "b" relative to the same patterns. By changing the wavelength of the acoustic waves AWx, the acoustic interference of the acoustic waves AWx changes, resulting in a corresponding change in the acoustic standing wave patterns and the optic phase grating 339, which ultimately causes the optical beam 37L to be deflected along a different deflection angle "c". Consequently, it is now possible to cause the optical beam 37 to be swept, and to scan the disk 205 in the X direction.

Figure 15:
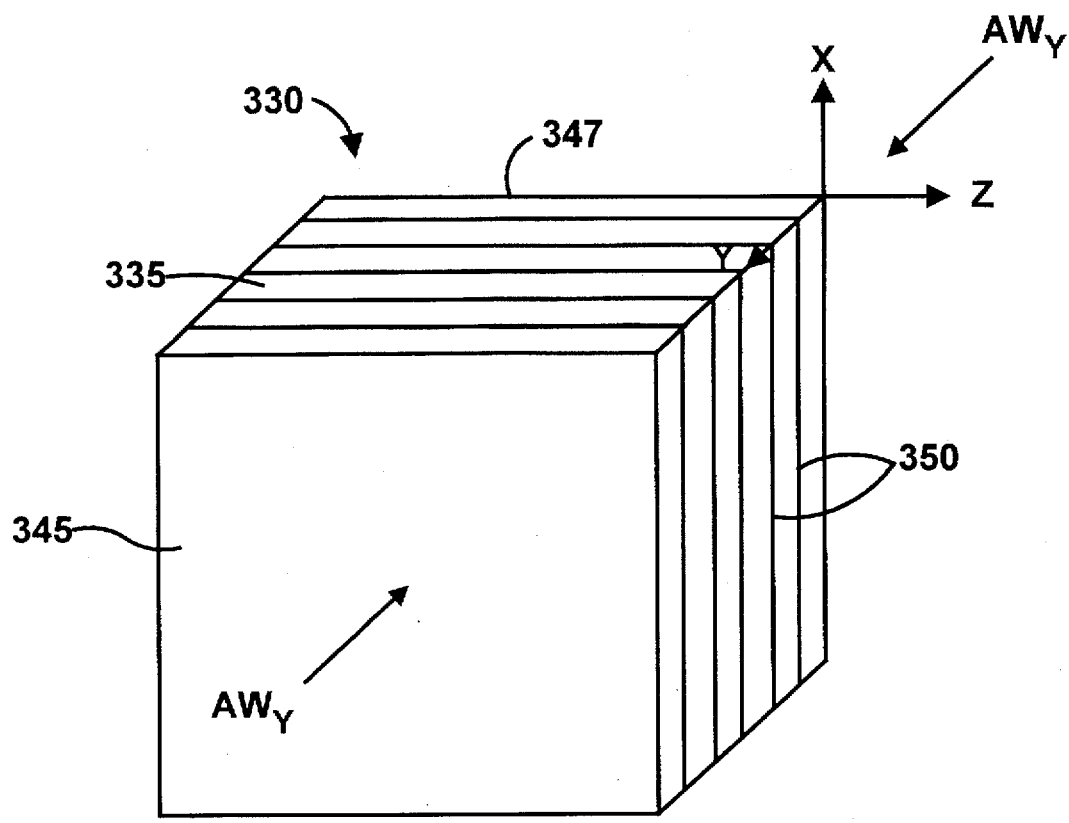
FIG. 15 is an enlarged perspective view of the acousto-optical crystal or photo-refractive crystal of FIG. 13, for controlling an optical beam deflection in the Y direction.

FIG. 15 illustrates a technique for controlling the sweeping or deflection of the optical or laser beam 37L in the Y direction. Two acoustic waves AWy have the same or substantially similar wavelength, intensity or amplitude, as they may originate from the same acoustic source and are thereafter split into two acoustic waves AWy.

The acoustic waves AWy impinge simultaneously upon the crystal 330 from two opposite sides 345, 347, along the Y direction. The acoustic waves AWy are generally normal to the sides 345, 347. The acoustic waves AWy interfere and form an acoustic standing wave pattern (or grating) which is normal to the incident the acoustic waves AWy. Due to the elasto-optic effect of the crystal 330, the optical refractive index "n" of the crystal 330 will be modulated by the interference pattern of the acoustic waves AWy.

The optical refractive index "n" results in an optic phase grating 350. The optic phase grating 350 includes patterns that are normal to the acoustic waves AWy. The optic phase grating 350 causes the impinging optical beam 37L to be deflected in the Y-direction as the optical beam 37.

Figure 16:
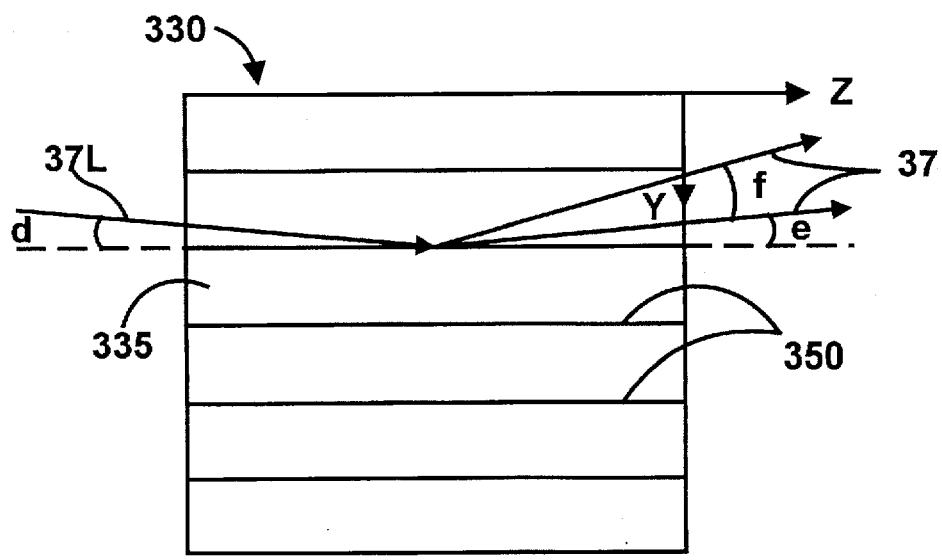
FIG. 16 is a top view of the acousto-optical crystal or photo-refractive crystal of FIG. 15.

As illustrated in FIG. 16, the optical beam 37L defines an angle of incidence "d" relative to the patterns of the optic phase grating 350, and the deflected optical beam 37 defines an angle of deflection "e" relative to the same patterns. By changing the wavelength of the acoustic waves AWy, the acoustic interference of the acoustic waves AWy changes, resulting in a corresponding change in the acoustic standing wave patterns and the optic phase grating 350, which ultimately causes the optical beam 37L to be deflected along a different deflection angle "f". Consequently, it is now possible to cause the optical beam 37 to be swept, and to scan the disk 205 in the Y direction.

The optical head 300 utilizes the crystal 330 and the acoustic waves Awx and AWy simultaneously, and includes a control circuit (not shown) that regulates the sweeping action, as desired along the plane containing the X and Y axes (2 dimensional sweeping).

The same or similar technique described above in relation to the acousto-optic sweeping method can be used as a holographic sweeping technique by replacing the acousto-optical crystal 330 with one or more photo-refractive crystals, for example LiNbO$_3$, BaTiO$_3$. The holographic grating inside the crystal 330 is then recorded by means of two coherent recording beams that impinge upon the crystal 330 from the same direction and that have the same wavelength. The laser beam 37L from the laser source 208 is deflected by the holographic grating, and, by changing the wavelength of the two coherent recording beams, the holographic grating changes accordingly, causing the resulting laser beam 37 to be steered between the outer and inner diameter tracks OD and ID, respectively, along the plane containing the X and Y axes, as desired.

Referring now to FIG. 12, the incident beam 37, or a part thereof is reflected by either the reflective layer 232 or the uncoated ridge 230, back toward the optical head 310 and impinges upon the beam splitter 212. The beam splitter 212 separates the incident beam 37 and the beam reflected by the disk 205, and deflects the reflected beam into a beam 37D which is detected by the photo-detector 214. The photo-detector 214 detects the intensity of the deflected laser beam 37D. If the intensity of the deflected beam 37D were greater than a predetermined level, the optical head 310 determines that the incident laser beam 37 was reflected by a ridge 230 with a reflective layer 232, and as a result reads a predetermined data bit, such as a "1". If on the other hand the intensity of the deflected beam 37D is less than a predetermined level, the optical head 310 determines that the incident laser beam 37 was not reflected by a ridge 230 with a reflective layer 232, and as a result reads a predetermined data bit, such as a "0".

Figure 18:
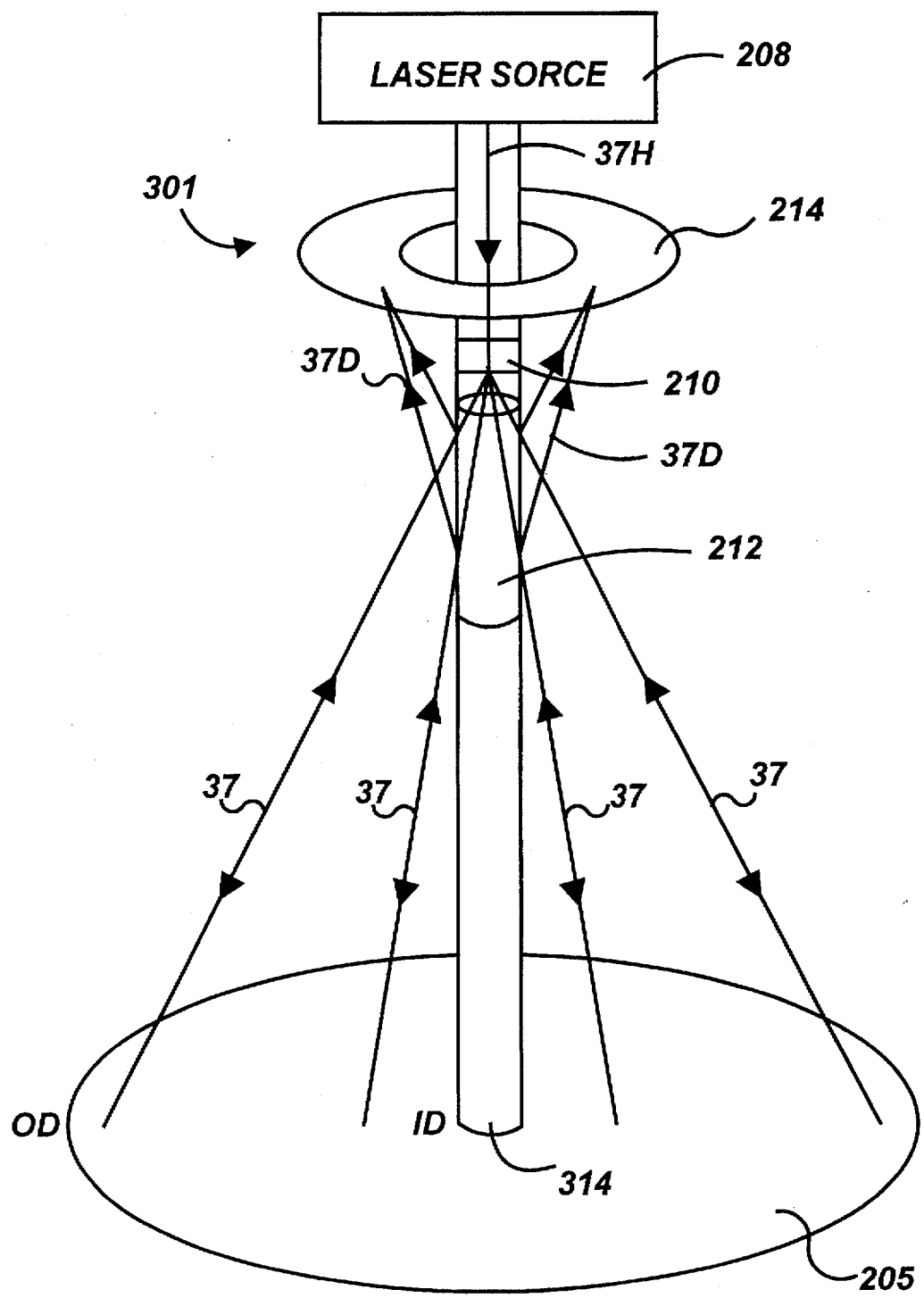
FIG. 18 is a schematic view of the optical data storage system illustrating additional structural details.

Reference is now made to FIG. 18, which illustrates one structural embodiment of the optical head 301. The axle 314 is stationary, cylindrically shaped, and passes through an opening in the geometric center of the disk 205. The beam splitter 212 is secured co-axially on top of, and relative to the axle 314. The beam splitter 212 is preferably cylindrically shaped and is hollow throughout its axial length. The beam splitter 212 has a reflective surface which is at least partly transmissive (or transparent) to the beam 37H from emanating from the laser source 208, and is at least partly reflective of the laser beam 37 reflected back from the disk (205) surface.

The crystal forming part of the beam steering element 210 is mounted in proximity to the beam splitter 212, co-axially relative to the axle 314. The photo-redetector 214 includes a photo-detector ring which fits co-axially relative to the axis of the axle 314.

The operation of the optical head 301 will now be described in more detail. The laser source emits the laser beam 37H which passes through the photo-detector ring 214 and impinges upon the beam steering element 210. The laser beam 37H is steered as described herein and passes through the beam splitter 212 which is at least partly transmissive to the laser beam 37H. The steered laser beam 37 impinges onto the disk 205 and is reflected back toward the splitter 212. The splitter 212 reflects the beam 37 off its outer surface into the beam 37D, toward the photo-detector ring 214. The beam 37D impinges upon or is captured by the photo-detector ring 214 for processing.

With reference to FIG. 11, the optical system 300 may include another optical head 310A positioned below or above the disk 205 on a convenient structure such as the platform 26. In addition, the optical head 310 may be positioned below the disk 205 so that the optical head 300 may now read data from a lower surface 252 of the disk 205 as well as an upper surface 251 of the disk 205. In such an embodiment the upper surface 251 and the lower surface 252 are patterned with lands and pits as described herein.

While the optical system 300 has been described as being stationary, it should be clear that the disk 205 may be rotatably secured to the chassis 18. Alternatively or additionally, the optical head 310 may be movable or adjustable along the axle 314, the platform 26, or any other structure on which it is mounted. Furthermore, while the optical head 310 is described as being mounted above the disk 205, the optical head 310 may be located underneath the disk 205.

For example, the optical system 300 may include one or two optical heads 310, 310A that are capable of translating up and down vertically. In another embodiment the platform 26 may translate laterally. In yet another embodiment one or both optical heads 310, 310A are capable of sliding vertically, and the platform 26 is capable of translating laterally.

In still another embodiment, the reflective layers 232, 236 are not necessarily flat and may be concave or convex, so long as the incident laser beam 37 is reflected generally back toward the optical 310 to be detected thereby. In a further embodiment the laser source 208 and the laser steering element 210 are disposed remotely from the beam splitter 212 and photo-detector 214 so that the incident laser beam 37 is not necessarily normal to the reflective layers 232, 236 provided the reflected laser beam impinges upon the beam splitter 212 for detection by the photo-detector 214.

In another embodiment the optical system 300 further includes an optional isolator 255 positioned between the laser source 208 and the beam steering element 210 so as to attenuate any residual laser beam which is reflected back to the laser source 208.

In still another embodiment the beam steering function is carried out holographically as well as by means of acousto-optical methods. In such a design, the laser beam 37L from the laser source 208 is first deflected using the acousto-optical method described herein, and the reflected laser beam is further deflected using the holographic technique described herein. Such double deflection will permit the optical head 310 to be positioned in closer proximity to the disk 205.

Figure 17:
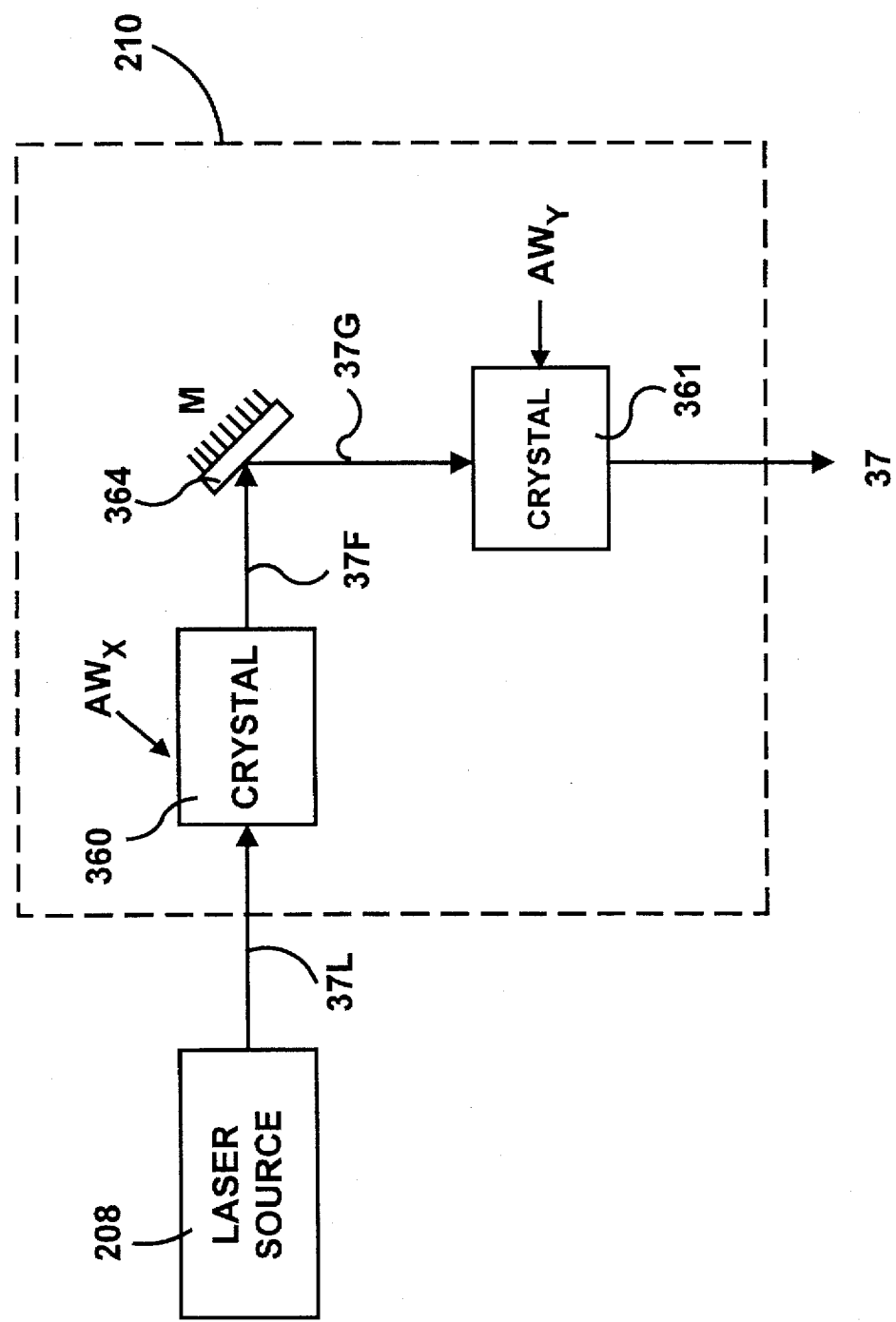
FIG. 17 is a schematic view of an alternative beam steering element of the optical storage system of FIGS. 11 and 12, for controlling the optical beam deflection in the X and Y directions.

Referring now to FIG. 17 it illustrates an alternative beam steering element 210 which utilizes two separate acousto-optical crystals 360, 361 and a reflective mirror 364. The acousto-optical crystal 360 causes the optical beam 37L to be deflected along the X direction in an optical beam 37F, as explained herein. The mirror 364 reflects the optical beam 37F in the direction of the acousto-optical crystal 361. The acousto-optical crystal 361 causes the optical beam 37L to be deflected along the Y direction as explained herein.

It should be understood that the geometry, compositions, and dimensions described herein may be modified within the scope of the invention. For instance, the inventive concept of the present invention may be extended to optical and magneto-optical media with multiple data layers. Furthermore, the optical head 310 may alternatively or additionally be moved pivotally. Other modifications may be made when implementing the invention for a particular environment.

What is claimed is:

1. An optical data storage medium comprising in combination:
   a light transmissive substrate for providing mechanical support;
   a light transmissive data substrate formed on said substrate; and
   said data substrate being patterned to form block regions that block light beam from passing through, and pass regions that allow light to pass through,
   such that the blockage or passage of light through the optical storage medium reflects the type of data bits to be stored on the optical medium.

2. The optical medium according to claim 1, wherein each of said block regions includes a reflective coating deposited in proximity to said substrate.

3. The optical medium according to claim 2, wherein said reflective coating has a smooth surface upon which light impinges and is reflected.

4. The optical medium according to claim 2, wherein said reflective coating has a roughened surface upon which light impinges and is diffracted.

5. The optical medium according to claim 1, further including a protective layer formed on top of said data substrate.

6. The optical medium according to claim 5, wherein each of said block regions includes a reflective coating deposited in proximity to said protective layer.

7. The optical medium according to claim 1, wherein said data substrate has a predetermined depth; and
   wherein each of said block regions includes a reflective coating deposited about halfway along the depth of said data substrate.

8. The optical medium according to claim 1, wherein said substrate and said data substrate have a combined thickness ranging between 1 mm and 1.2 mm.

9. The optical medium according to claim 1, wherein said substrate is made of any of: glass, polycarbonate, or polymer material.

10. The optical medium according to claim 1, wherein each of said block regions indicate that a data bit "0" is recorded; and
    wherein each of said pass regions indicates that a data bit "1" is recorded.

11. The optical medium according to claim 1, wherein each of said block regions indicate that a data bit "1" is recorded; and
    wherein each of said pass regions indicates that a data bit "0" is recorded.

12. A magneto-optical data storage medium transmissive to light, and comprising in combination:
    a light transmissive substrate for providing mechanical support;
    a light transmissive magneto-optical data substrate formed on said substrate;
    said data substrate being recordable by patterning a magnetic domain with magnetic fields of opposite directions, such that each magnetic direction reflects the type of data bits to be stored on the optical medium; and
    a light transmissive protective layer formed on said data substrate.

13. The magneto-optical medium according to claim 12, wherein said data substrate is coated with a writeable optical storage film.

14. The magneto-optical medium according to claim 12, wherein said data substrate is formed of an erasable optical storage film.

15. The magneto-optical medium according to claim 14, wherein said data substrate is formed of a phase change optical storage film.

16. The magneto-optical medium according to claim 15, wherein said data substrate is formed of rare earth or transition metal material.

17. The magneto-optical medium according to claim 12, wherein said data substrate is formed of two or more erasable and writeable optical storage films.

18. The magneto-optical medium according to claim 12, further including a light transmissive undercoat formed between said substrate and said magneto-optical data substrate.

19. The magneto-optical medium according to claim 12, further including a light transmissive overcoat formed on top of said magneto-optical data substrate.

20. The magneto-optical medium according to claim 12, wherein said magneto-optical data substrate further includes block regions that block light beam from passing through, and pass regions that allow light to pass through, such that the blockage or passage of light through the optical storage medium reflects the type of data bits to be stored on the optical medium.

21. An optical data storage medium for use with an optical head irradiating a light beam, the medium comprising in combination:

a pattern of lands and pits;

at least some of said pits including a ridge generally normal to the path of the light beam incident thereon;

wherein when it is desired to record a predetermined data bit onto the disk a corresponding ridge is coated with a reflective layer.

* * * * *